US008366011B2

(12) United States Patent
Hovis et al.

(10) Patent No.: US 8,366,011 B2
(45) Date of Patent: Feb. 5, 2013

(54) TWO DIMENSIONAL BAR CODE HAVING INCREASED ACCURACY

(75) Inventors: Gregory Hovis, Martinez, GA (US);
William Ranson, Columbia, SC (US);
Reginald Vachon, Atlanta, GA (US)

(73) Assignee: Direct Measurements, Inc., Atlanta, GA (US)

( * ) Notice: Subject to any disclaimer, the term of this patent is extended or adjusted under 35 U.S.C. 154(b) by 0 days.

(21) Appl. No.: 13/238,550

(22) Filed: Sep. 21, 2011

(65) Prior Publication Data

US 2012/0185182 A1 Jul. 19, 2012

Related U.S. Application Data

(63) Continuation of application No. 12/311,054, filed as application No. PCT/US2007/018185 on Aug. 16, 2007, now abandoned.

(60) Provisional application No. 60/838,151, filed on Aug. 17, 2006, provisional application No. 60/838,152, filed on Aug. 17, 2006, provisional application No. 60/838,153, filed on Aug. 17, 2006, provisional application No. 60/838,155, filed on Aug. 17, 2006, provisional application No. 60/838,201, filed on Aug. 17, 2006.

(51) Int. Cl.
*G06K 19/06* (2006.01)
*G06K 7/10* (2006.01)

(52) U.S. Cl. .............. 235/494; 235/462.01; 235/462.09; 235/462.1

(58) Field of Classification Search ................. 235/435, 235/436, 454, 462.01, 462.07–462.11, 494
See application file for complete search history.

(56) References Cited

U.S. PATENT DOCUMENTS

| | | | |
|---|---|---|---|
| 4,939,354 A | 7/1990 | Priddy et al. | |
| 5,053,609 A | 10/1991 | Priddy et al. | |
| 5,124,536 A | 6/1992 | Priddy et al. | |
| 5,612,524 A * | 3/1997 | Sant'Anselmo et al. | 235/494 |
| 5,726,435 A | 3/1998 | Hara et al. | |
| 5,777,309 A | 7/1998 | Maltsev et al. | |
| 5,811,776 A | 9/1998 | Liu | |
| 5,862,267 A | 1/1999 | Liu | |
| 6,000,614 A * | 12/1999 | Yang et al. | 235/460 |
| 6,244,764 B1 * | 6/2001 | Lei et al. | 400/103 |
| 6,267,296 B1 | 7/2001 | Ooshima et al. | |
| 6,802,450 B2 | 10/2004 | Cheung et al. | |
| 6,866,199 B1 | 3/2005 | Keech et al. | |
| 6,874,370 B1 | 4/2005 | Vachon | |
| 6,934,013 B2 | 8/2005 | Vachon et al. | |
| 7,028,911 B2 | 4/2006 | Cheung et al. | |
| 7,188,778 B2 | 3/2007 | Pinson | |
| 2004/0036853 A1 | 2/2004 | Vachon et al. | |
| 2006/0231635 A1 | 10/2006 | Kim et al. | |
| 2006/0289652 A1 | 12/2006 | Hovis et al. | |

FOREIGN PATENT DOCUMENTS

WO 2005125020 A1 12/2005

\* cited by examiner

*Primary Examiner* — Thien M Le
*Assistant Examiner* — April Taylor
(74) *Attorney, Agent, or Firm* — Jacobson Holman PLLC

(57) ABSTRACT

A two-dimensional matrix code containing dark and light square data modules, and a finder pattern of two bars of alternating dark and light square data modules on the perimeter of the symbol for indicating both orientation and printing density of the symbol, wherein all of the data modules are the same dimension and data is encoded based on the absolute position of the dark modules within the matrix, and inner and outer bars are provided along adjacent sides of the matrix code symbol, each bar having a width equal to the square data modules. In one embodiment, the inner and outer bars are solid. In another embodiment, the inner solid is bar and the outer bar is an encoding bar.

8 Claims, 1 Drawing Sheet

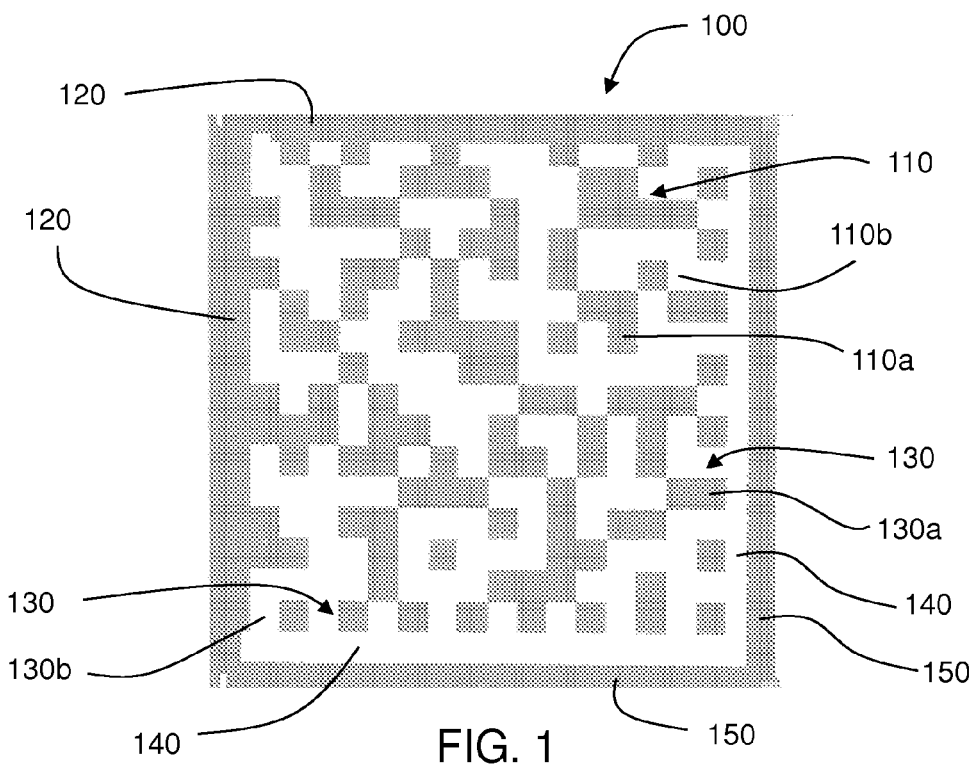
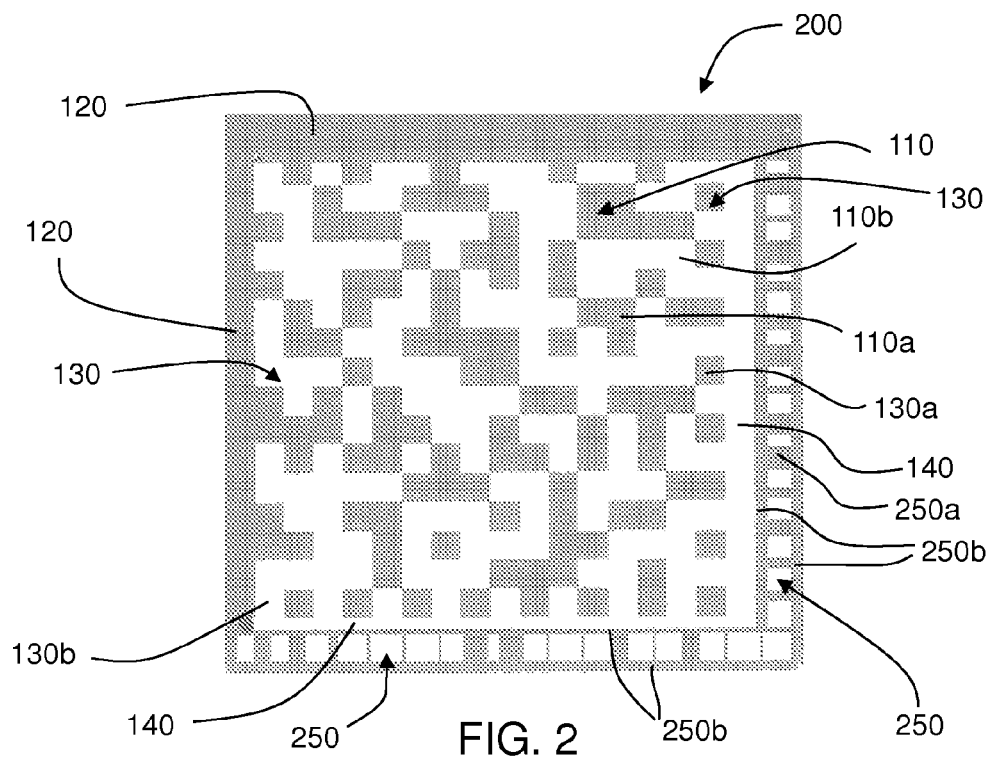

ously, application Ser. No. 12/311,054, filed Aug. 26, 2009 now abandoned, which is a nationalization of International application No. PCT/US2007/018185, filed Aug. 16, 2007, published in English, which is based on, and claims priority from, U.S. provisional Application No. 60/838,151, 60/838,152, 60/838, 153, 60/838,155, and 60/838,201, all filed Aug. 17, 2006, which are incorporated herein by reference in their entireties.

TWO DIMENSIONAL BAR CODE HAVING INCREASED ACCURACY

The present patent application a continuation of U.S. application Ser. No. 12/311,054, filed Aug. 26, 2009 now abandoned, which is a nationalization of International application No. PCT/US2007/018185, filed Aug. 16, 2007, published in English, which is based on, and claims priority from, U.S. provisional Application No. 60/838,151, 60/838,152, 60/838, 153, 60/838,155, and 60/838,201, all filed Aug. 17, 2006, which are incorporated herein by reference in their entireties.

BACKGROUND OF THE INVENTION

1. Field of the Invention

The present invention relates to two-dimensional bar codes. More specifically, the invention relates to a matrix code that provides increased accuracy.

2. Related Art

The "two dimensional bar code" was developed by NASA to identify and track space shuttle parts. The bar code pattern can be used to encode inventory data or a history of the object to which it is attached, as described in "A White Paper on Two Dimensional Symbols," by Paul Mathans et al. (CSPI Vision Systems 1996).

The "two-dimensional bar code" is more formally referred to as a matrix code, a term that applies to two-dimensional codes that code data based on the position of dark modules within a matrix. All of the dark modules are the same dimension, and it is the positions of the modules that code the data. Data Matrix is a type of two-dimensional matrix code containing dark and light square data modules. It is designed to pack a lot of information in a very small space; a Data Matrix symbol can store between one and 3116 numeric or 2335 alphanumeric characters. A Data Matrix symbol has a finder pattern of two solid bars and two alternating dark and light square data modules on the perimeter of the symbol. These patterns are used to indicate both orientation and printing density of the symbol. A two-dimensional imaging device such as a CCD camera is used to scan the symbology.

The information in a Data Matrix symbol is encoded by absolute dot position rather than relative dot position. While a Data Matrix symbol is easily scalable between a 1-mil square to a 14-inch square, the actual limits are dependent on the fidelity of the marking device and the optics of the sensor. Data Matrix symbols can be used for small item marking applications using a wide variety of printing and marking technologies.

Additional information regarding Data Matrix code is disclosed in U.S. Pat. Nos. 4,939,354; 5,053,609; 5,124,536.

It is to the solution of these and other problems that the present invention is directed.

SUMMARY OF THE INVENTION

It is accordingly a primary object of the present invention to provide a matrix code that has improved accuracy relative to a conventional Data Matrix code.

This and other objects of the invention are achieved by the provision of a matrix code symbol based on a conventional Data Matrix code, and comprising a two-dimensional matrix code containing dark and light square data modules, and a finder pattern of two solid bars and two bars of alternating dark and light square data modules on the perimeter of the symbol for indicating both orientation and printing density of the symbol, wherein all of the dark and light modules are the same dimension, and data is encoded based on the absolute position of the dark modules within the matrix.

In a first embodiment, the matrix code symbol differs from a conventional Data Matrix code in the addition of inner and outer solid bars along the base and right-hand side of the matrix code symbol, the inner and outer solid bars each having a width equal to the square data modules, the inner solid bar being light and the outer solid bar being dark.

In a second embodiment, the matrix code symbol differs from a conventional Data Matrix code in the addition of an inner solid bar and at least one outer encoding bar along the base and right-hand side of the matrix code symbol, the inner solid bar and the at least one outer encoding bar each having a width equal to the square data modules, the inner solid bar being light and the at least one outer encoding bar comprising a number of side-by-side data cells, wherein each data cell represents a single bit of binary data and the binary data is encoded using an error-correcting code (ECC) algorithm.

Both embodiments of the matrix code symbol can incorporate the target of a strain gage as described in application Ser. No. 10/890,994 and U.S. Pat. No. 6,934,013. A strain gage in accordance with the present invention comprises a target associated with a body for which at least one of strain and fatigue damage is to be measured, sensor means for pre-processing a detectable physical quantity emitted by the target and output data representing the physical quantity, the sensor means being compatible with the detectable physical quantity, means for analyzing the data output by the sensor means to define the symbolic strain rosette, and means for measuring the strain on the body directly based on the pre-processed and analyzed data, wherein the target is a Symbolic Strain Rosette incorporated in one of the embodiments of the matrix code symbol.

In a method of measuring at least one of strain and fatigue damage on an object directly, in accordance with a present invention, a symbolic strain rosette incorporated in one of the embodiments of the matrix code symbol is associated with an object in such a way that deformation of the symbolic strain rosette and deformation under load of the object bear a one-to-one relationship. The changes in the symbolic strain rosette are identified as a function of time and change in the load applied to the object. The changes in the symbolic strain rosette are then translated into a direct measurement of strain.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 shows a first embodiment of a matrix code symbol in accordance with the present invention.

FIG. 2 shows a second embodiment of a matrix code symbol in accordance with the present invention.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIGS. 1 and 2 respectively show first and second embodiments 100 and 200 of a matrix code symbol in accordance with the present invention. Both embodiments of the matrix code symbol are based on the Data Matrix code disclosed in U.S. Pat. Nos. 4,939,354; 5,053,609; and 5,124,536, and can incorporate a Symbolic Strain Rosette for use as a target in a compressed symbology strain gage as described in U.S. Pat. No. 6,934,013.

The first embodiment of the matrix code symbol 100 (shown in FIG. 1) comprises a two-dimensional matrix code 110 containing dark and light square data modules 110a and 110b arranged in a matrix, and a finder pattern of two solid bars 120 and two bars 130 of alternating dark and light square data modules 130a and 130b on the perimeter of the matrix for indicating both orientation and printing density of the symbol 100, wherein all of the dark and light modules 110a, 110b, 130a, and 130b are the same dimension, and data is encoded based on the absolute position of the dark modules 110a within the matrix. As shown in FIG. 1, the two solid bars 120 are on one pair of adjacent sides of the perimeter, and the two bars 130 of alternating dark and light data modules 130a and 130b are on the opposite pair of adjacent sides. There are no restrictions placed on the colors of the dark and light modules, except that sufficient contrast is provided to enable a sensor to determine module state (that is, "dark" or "light").

The first embodiment 100 of the matrix code symbol differs from a conventional Data Matrix code in the addition of inner and outer solid bars 140 and 150 along the base and right-hand side of the matrix code symbol, that is, adjacent to the two bars 130 of alternating dark and light square data modules 130a and 130b, as shown in FIG. 1. The inner and outer solid bars 140 and 150 each have a width equal to the square data modules 110a and 110b, the inner solid bar 140 being light and the outer solid bar 150 being dark. The dark, outer solid bar 150 increases the accuracy of the use of the Data Matrix symbol but does not provide more encoded data.

The first embodiment 100 of the matrix code symbol can incorporate the target of a strain gage as described in U.S. Pat. Nos. 6,874,370 and 6,934,013, the disclosures of which are incorporated herein by reference in their entireties. A strain gage employing the first embodiment uses a computer to implement the same theory and programs as the strain gage of U.S. Pat. No. 6,934,013. When used as such a target, the first embodiment increases the accuracy of the strain measurements made.

The second embodiment 200 of the matrix code symbol (FIG. 2) comprises a two-dimensional matrix 110 containing dark and light square data modules 110a and 110b, and a finder pattern of two solid bars 120 and two bars 130 of alternating dark and light square data modules 130a and 130b on the perimeter of the symbol 200 for indicating both orientation and printing density of the symbol, wherein all of the data modules 110a, 110b, 130a, and 130b are the same dimension and data is encoded based on the absolute position of the dark modules 110a within the matrix. The second embodiment 200 of the matrix code symbol differs from a conventional Data Matrix code in the addition of an inner solid bar 140 and at least one outer encoding bar 250 along the base and right-hand side of the matrix code symbol 200, that is, adjacent to the two bars 130 of alternating dark and light square data modules 130a and 130b, as shown in FIG. 2. The inner solid bar 140 and the at least one outer encoding bar 250 each have a width equal to the square data modules 110a, 110b, 130a, and 130b, the inner solid bar being 140 light and the at least one outer encoding bar 250 being the same as a data region as described in U.S. Published Application No. 2006-0289652 A1 (Ser. No. 11/167,558, filed Mar. 24, 2006) comprising a number of side-by-side data cells 250a, wherein each data cell 250 represents a single bit of binary data and the binary data is encoded using an error-correcting code (ECC) algorithm. The at least one outer encoding bar 250 is bounded by solid dark lines 250b, which provide an outer boundary for the ECC algorithm and greater accuracy for strain measurement.

Although the second embodiment 200 as shown in FIG. 2 has one encoding bar 250 along the base and right-hand side of the matrix code symbol, the matrix code symbol 200 in accordance with the second embodiment of the invention can have a plurality of encoding bars 250 along the base and right-hand side. The encoding bars 250 permit the encoding of additional data and provide improved accuracy relative to a conventional Data Matrix symbol.

The second embodiment 200 of the matrix code symbol can incorporate the target of a strain gage as described in U.S. Pat. Nos. 6,874,370 and 6,934,013. A strain gage employing the second embodiment also uses a computer to implement the same theory, algorithms, and computer programs as the strain gage of U.S. Pat. No. 6,934,013, which (1) identify the Symbolic Strain Rosette and the changes therein as a function of time and change in the load, (2) translate the changes in the Symbolic Strain Rosette into strain, and (3) display it in a suitable format. When used as such a target, the second embodiment also increases the accuracy of the strain measurements made. The second embodiment also increases the accuracy of data that can be termed a "license plate" (because the encoded data can be used to identify a symbol being used to measure strain, much as a license plate can be used to identify a vehicle).

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A target for association with an object for which at least one of strain and fatigue damage is to be measured, the target incorporating a matrix code symbol, the matrix code symbol emitting a detectable physical quantity and including:
   a Data Matrix symbol having:
      a two-dimensional matrix having a perimeter and containing dark and light square data modules, wherein data is encoded based on the absolute position of the dark modules within the matrix; and
      a finder pattern of two solid bars and two bars of alternating dark and light square data modules on the perimeter of the matrix for indicating both orientation and printing density of the symbol, wherein all of the dark and light data modules of the matrix are the same dimension, wherein the two solid bars are on one pair of adjacent sides of the perimeter of the matrix and the two bars of alternating dark and light data modules are on the opposite pair of adjacent sides of the perimeter of the matrix, and wherein the finder pattern defines the perimeter of the Data Matrix symbol;
   a solid inner bar outside the perimeter of the Data Matrix symbol, only adjacent each of the finder pattern bars of alternating dark and light data modules; and
   at least one outer bar positioned adjacent each inner bar, with each inner bar being interposed between the perimeter of the Data Matrix symbol and the at least one outer bar, wherein the at least one outer bar is configured to increase the accuracy of the use of the Data Matrix symbol;

wherein the inner and outer bars each have a width equal to the square data modules.

2. The target of claim 1, wherein there is one outer bar adjacent each inner bar, the outer bars are solid, and one of the inner and outer bars is light and the other of the inner and outer bars is dark.

3. The target of claim 2, wherein the inner solid bar is light and the outer solid bar is dark.

4. The target of claim 1, wherein the inner bar is light and at least one outer bar is an encoding bar comprising a plurality of side-by-side data cells, wherein each data cell represents a single bit of binary data and the binary data is encoded using an error-correcting code (ECC) algorithm.

5. The target of claim 4, wherein the at least one outer encoding bar further comprises solid dark boundary lines providing an outer boundary for the ECC algorithm and greater accuracy for strain measurement.

6. The target of claim 4, wherein there are a plurality of outer bars parallel to each other and adjacent each inner bar for encoding additional data.

7. A non-linear strain gage comprising:
a target associated with an object for which at least one of strain and fatigue damage is to be measured, the target comprising a matrix code symbol emitting a detectable physical quantity and including:
  (a) a Data Matrix symbol having:
    a two-dimensional matrix having a perimeter and containing dark and light square data modules, wherein data is encoded based on the absolute position of the dark modules within the matrix; and
    a finder pattern of two solid bars and two bars of alternating dark and light square data modules on the perimeter of the matrix for indicating both orientation and printing density of the symbol, wherein all of the dark and light data modules of the matrix are the same dimension, wherein the two solid bars are on one pair of adjacent sides of the perimeter of the matrix and the two bars of alternating dark and light data modules are on the opposite pair of adjacent sides of the perimeter of the matrix, and wherein the finder pattern defines the perimeter of the Data Matrix symbol;
  (b) a solid inner bar outside the perimeter of the Data Matrix symbol, only adjacent each of the finder pattern bars of alternating dark and light data modules; and
  (c) at least one outer bar positioned adjacent each inner bar, with each inner bar being interposed between the perimeter of the Data Matrix symbol and the at least one outer bar, wherein the at least one outer bar is configured to increase the accuracy of the use of the Data Matrix symbol;
  wherein the inner and outer bars each have a width equal to the square data modules;

sensor means for pre-processing the detectable physical quantity emitted by the target and output data representing the physical quantity, the sensor means being compatible with the detectable physical quantity;
means for analyzing the data output by the sensor means to define the matrix code symbol; and
means for measuring the strain on the object directly based on the pre-processed and analyzed data.

8. A method of measuring strain on an object directly, comprising the steps of:
associating a target with an object in such a way that deformation of the matrix code symbol and deformation under load of the object bear a one-to-one relationship, wherein the target comprises a matrix code symbol emitting a detectable physical quantity and including:
  (a) a Data Matrix symbol having:
    a two-dimensional matrix having a perimeter and containing dark and light square data modules, wherein data is encoded based on the absolute position of the dark modules within the matrix; and
    a finder pattern of two solid bars and two bars of alternating dark and light square data modules on the perimeter of the matrix for indicating both orientation and printing density of the symbol, wherein all of the dark and light data modules of the matrix are the same dimension, wherein the two solid bars are on one pair of adjacent sides of the perimeter of the matrix and the two bars of alternating dark and light data modules are on the opposite pair of adjacent sides of the perimeter of the matrix, and wherein the finder pattern defines the perimeter of the Data Matrix symbol;
  (b) a solid inner bar outside the perimeter of the Data Matrix symbol, only adjacent each of the finder pattern bars of alternating dark and light data modules; and
  (c) at least one outer bar positioned adjacent each inner bar, with each inner bar being interposed between the perimeter of the Data Matrix symbol and the at least one outer bar, wherein the at least one outer bar is configured to increase the accuracy of the use of the Data Matrix symbol;
  wherein the inner and outer bars each have a width equal to the square data modules;
identifying the changes in the matrix code symbol as a function of time and change in the load applied to the object; and
translating the changes in the matrix code symbol into a direct measurement of strain.

* * * * *